INVENTORS.
DONALD S. HORNE,
ROBERT ASHTON &
LESLIE L. KEPKAY.
BY
Wolf, Hubbard, Voit + Osann
ATTORNEYS.

United States Patent Office 2,999,556
Patented Sept. 12, 1961

2,999,556
OPERATOR'S PLATFORM FOR COMBINES
Donald S. Horne, Robert Ashton, and Leslie L. Kepkay, Toronto, Ontario, Canada, assignors to Massey-Ferguson Limited, Toronto, Ontario, Canada, a corporation of Canada
Filed Dec. 18, 1959, Ser. No. 860,535
3 Claims. (Cl. 180—89)

The present invention relates to agricultural combines and concerns more particularly an operator's platform and access ladder for such machines.

It is an object of the invention to provide an improved operator's platform and access ladder for combines which gives the operator an excellent view of the crop cutting and feeding action of his machine without increasing the width of the combine or making it dangerous to move onto or off of the platform.

More particularly, it is an object of the invention to provide a platform of the above type that enables the over-all width of a high capacity combine to be held below the width limitation which would prevent unrestricted use of the highways.

Again with more particularity, it is an object to provide an access ladder arrangement of the above-mentioned type which provides a safe course from the ground to the operator's platform that is well clear of the potentially dangerous ground wheels of the combine.

Another object of the invention is to provide a platform and access ladder as characterized above that does not interfere with the accessibility of the combine mechanisms which may require adjustment or servicing.

It is a further detailed object to provide an access ladder as referred to above that is readily movable to an out-of-the-way position and which is easy and convenient to handle.

Other objects and advantages of the invention will become apparent upon reading the following detailed description and upon reference to the drawings in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
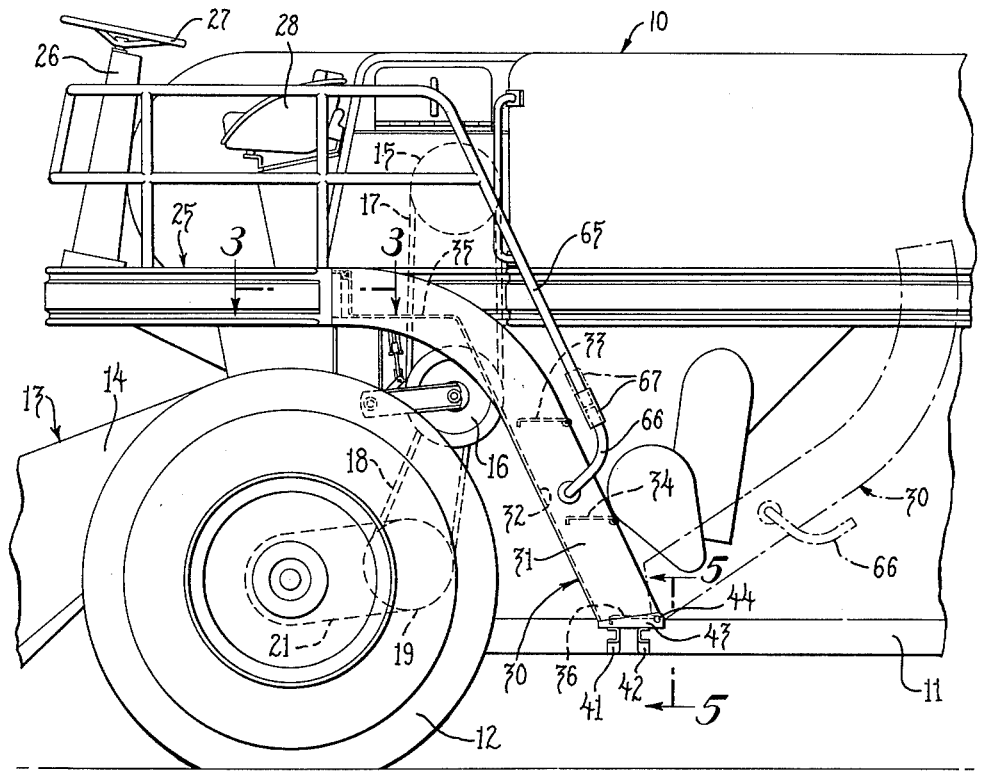
FIGURE 1 is a fragmentary side elevation of a combine embodying the invention.
Figure 2:
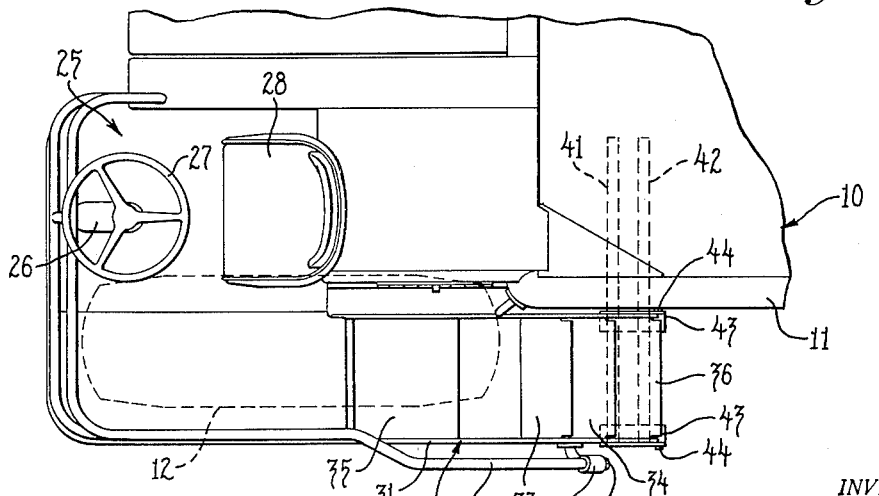
FIG. 2 is a fragmentary plan of a portion of the combine structure shown in FIG. 1.

Turning now to FIGS. 1 and 2, there is fragmentarily shown a combine 10 embodying the invention. A combine of this general type is illustrated and described in copending application Serial No. 744,156 filed June 24, 1958, assigned to the assignee of the present invention, and reference is made to this application for further details of construction. The combine 10 includes a frame or body 11 which is supported by a plurality of ground engaging wheels of which only the front drive wheel 12 appears in the drawings. At the left in FIG. 1, the forward end of the combine, a header assembly 13 is mounted which includes an elevator housing 14.

For providing power to the drive wheel 12, a power train including a pulley 15 on the drive shaft of the combine, a variable speed pulley 16 and connecting belts 17 and 18, are positioned alongside of the combine body 11. The belt 18 is trained about a pulley 19 which powers a transmission and clutch assembly 21 that is coupled to the axle of the drive wheel 12.

In order to give the combine operator a clear view of the crop cutting and feeding action of his machine, the combine 10 is provided with an operator's platform 25 located at the top front of the body 11 above the level of the drive wheel 12. The platform 25 carries an operator's seat 28 and a control column 26 on which a steering wheel 27 for the combine is mounted. It will be appreciated that because of the elevated and forward position of the operator's platform 25, the operator is provided with an unobstructed view down and forward of the machine.

In accordance with the invention, access to the platform 25 is obtained by utilizing a ladder 30 extending alongside the body 11 from the platform back over the wheel 12 to a point near the bottom of the combine body where the ladder is hinged so that it can be tilted away from the platform to make accessible that area of the body which is adjacent the front wheel 12. In the preferred embodiment, the ladder 30 is formed of a frame 31 having a bottom panel 32 and a series of supports or steps 33 and 34. The bottom panel 32 is bent to define a top step or support 35 and a bottom step or support 36.

Figure 4:
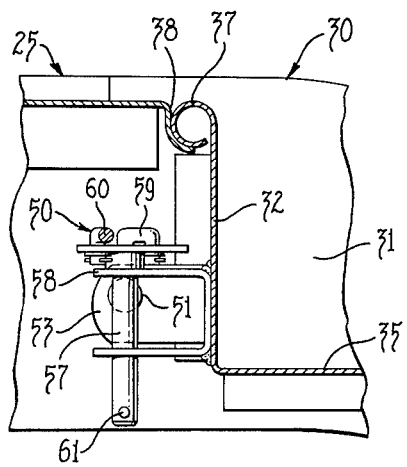
FIG. 4 is a fragmentary section taken along the line 4—4 of FIG. 3.

To establish the normal operative position of the ladder 30, the upper end of the panel 32 is curled at 37 and received within an arcuate groove 38 formed at the edge of the operator's platform 25 (see FIG. 4).

Figure 5:
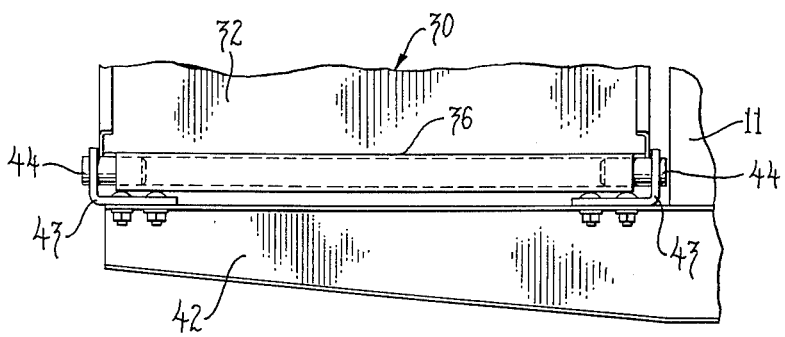
FIG. 5 is a fragmentary section taken approximately on the line 5—5 of FIG. 1.

The ladder 30 is hinged to the combine body 11 by hinge structure which includes a pair of beams 41, 42 that extend laterally from the combine body. The beams 41, 42 carry brackets 43 which rotatably receive pins 44 fixed on the bottom of the ladder 30 (see FIG. 5).

Because of the hinged connection, the ladder 30 can swing from its operative, solid line, position shown in FIG. 1 to the tilted, dashed line, position also shown in this figure. When in operative position, the ladder 30 provides access from the ground to the operator's platform 25 and it will be noted that an operator mounting the ladder 30 does not climb in close proximity to the drive wheel 12. Thus, there is little danger of a person stepping from the ladder 30 beneath the drive wheel when the combine is still rolling. The platform and ladder thus far described is therefore quite safe.

When the ladder is swung to its tilted, dashed line, position it can be seen that the area of the combine body adjacent the drive wheel 12 is exposed for easy accessibility. Thus, the combine driving elements including pulleys 15, 16, and 19 and belts 17 and 18 are readily accessible for servicing and adjustment.

For firmly locking the ladder in its operative position, a releasable latch 50 is provided to couple the ladder to the operator's platform 25. In the illustrated embodiment, the latch 50 includes a pair of opposed latch bars 51 and 52 which are slidably mounted in brackets 53 and 54 respectively, that are fixed to the underside of the ladder bottom panel 32 (see FIGS. 3 and 4). The latch bars 51, 52 are received within collars 55, 56 respectively, secured to the operator's platform. It will thus be appreciated that when bars 51, 52 are fitted into the collars 55, 56, the ladder 30 is locked securely in operative position.

To release the latch 50, a release crank 57 is pivoted in a bracket 58 secured to the ladder bottom panel 32. Links 59 and 60 couple the release crank 57 to the bars 51 and 52 respectively, and the crank is provided with a handle 61. T maintain the latch 50 in a normally latched condition, a tensioned spring 62 is extended between the release crank 57 and the bracket 53.

Figure 3:
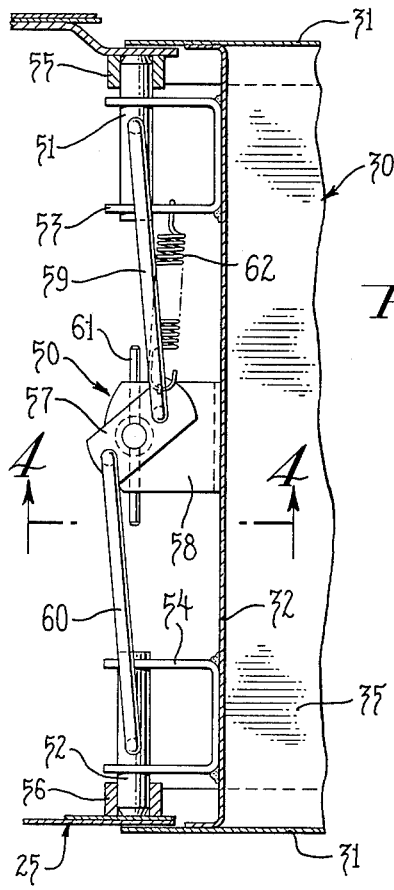
FIG. 3 is a fragmentary section taken approximately along the line 3—3 of FIG. 1.

To operate the latch 50, it will be apparent that the operator simply grasps the handle 61 and turns the crank in a clockwise direction as viewed in FIG. 3. This withdraws the bars 51, 52 from the collars 55, 56 respectively, whereupon the ladder is freed from the combine body and may be lifted by the operator upon his exerting an upward force on the crank handle 61.

For enhancing the safe use of the ladder 30 a hand rail 65 is secured to the combine body so as to extend from above the platform 25 down along the ladder 30, and a hand rail stub 66 is mounted on the ladder in alinement with and forming a continuation of the hand rail 65. The hand rail 65 and the stub 66 are releasably locked against misalinement by a sleeve 67 that loosely surrounds the alined ends of the rail and stub. The rail and stub thus present an unbroken hand hold extending up along the ladder 30 which facilitates the safe use of the ladder.

When it is desired to tilt the ladder to its out-of-the-way position, the sleeve 67 is slid upwardly along the hand rail 65 to its dashed line position shown in FIG. 1 so as to completely clear the hand rail stub 66. This not only frees the ladder for tilting movement but also allows the hand rail stub 66 to serve as a convenient handle which may be used for swinging the ladder 30 between its operative and out-of-the-way positions.

In summary, it can be seen that applicants have provided a simple and economical operator's platform and access ladder construction which provides a safe course from the ground up to the operator's station on the combine. The ladder 30 faces away from the adjacent drive wheel 12 so that there is little danger of accidental injury.

In addition, it is most important to observe that the disclosed platform and access ladder do not appreciably add to the width of the combine structure. As can be seen in FIG. 2, the platform and ladder assembly extends laterally only a slight distance beyond the drive wheel 12. Thus, the wheel to wheel width of the combine 10 can be kept sufficiently great to enable the combine to include wide, high capacity harvesting and threshing subassembles without resulting in an over-all combine width greater than the maximum permitted vehicles having unrestricted use of the highways. In other words, the efficiently located operator's platform 25 and the safe and conveniently usable access ladder 30 do not require a significant increase in over-all combine width so that the full width of the machine can be utilized to receive efficient, high capacity grain handling components.

We claim as our invention:

1. In a combine having a body supported by ground engaging wheels which include a front wheel, the combination comprising, an operator's platform mounted on the top front of said body at a level above the top of said front wheel, an inclined frame extending fore and aft of said body from said platform back over said front wheel to a point near the bottom of said body, supports on said frame permitting an operator to easily climb to and descend from said platform, and horizontal hinge structure joining said frame and said body at said point arranged so that said frame can be tilted about a horizontal axis back away from the platform to make accessible that area of the body which is adjacent said front wheel.

2. In a combine having a body supported by ground engaging wheels which include a front drive wheel, the combination comprising, an operator's platform mounted on the top front of said body at a level above the top of said front drive wheel, an inclined frame extending fore and aft of said body from said platform back over said front wheel to a point near the bottom of said body, steps on said frame permitting an operator to easily climb to and descend from said platform, horizontal hinge structure joining said frame and said body at said point arranged so that said frame can be tilted about a horizontal axis back away from the platform to make accessible that area of the body which is adjacent said front wheel, and a latch releasably locking said frame in position adjacent said platform.

3. In a combine having a body supported by ground engaging wheels which include a front drive wheel, the combination comprising, an operator's platform mounted on the top front of said body at a level above the top of said front drive wheel, an inclined frame extending fore and aft of said body from said platform back over said front wheel to a point near the bottom of said body, steps on said frame permitting an operator to easily climb to and descend from said platform, hinge structure joining said frame and said body at said point arranged so that said frame can be tilted about the hinge structure back away from the platform to make accessible that area of the body which is adjacent said front wheel, a latch releasably locking said frame in position adjacent said platform, a hand rail mounted on said body extending from said platform down along said frame, a hand rail stub mounted on said frame alined with and forming a continuation of said hand rail, and means for releasably locking said hand rail and said stub against misalinement, said stub forming a handle for tilting said frame when said latch and said means are released.

References Cited in the file of this patent

UNITED STATES PATENTS

| | | |
|---|---|---|
| 2,699,223 | Brumbaugh | Jan. 11, 1955 |
| 2,834,633 | Ashton | May 13, 1958 |
| 2,868,310 | Lee | Jan. 13, 1959 |
| 2,873,979 | Vendity et al. | Feb. 17, 1959 |
| 2,925,874 | Norrie | Feb. 23, 1960 |

OTHER REFERENCES

John Deere: Predelivery Instructions, PDI–H13–157; received in Patent Office September 5, 1956. (Page 9 only relied on, 25 pages total.)